US008834060B2

(12) United States Patent
Lawry

(10) Patent No.: US 8,834,060 B2
(45) Date of Patent: Sep. 16, 2014

(54) ARRANGEMENT AND METHOD FOR FACILITATING WATER USAGE

(75) Inventor: David Stanley Lawry, Colonel Light Gardens (AU)

(73) Assignee: Vilenna Investments Pty Ltd, Colonel Light Gardens (AU)

( * ) Notice: Subject to any disclaimer, the term of this patent is extended or adjusted under 35 U.S.C. 154(b) by 0 days.

(21) Appl. No.: 13/392,514

(22) PCT Filed: Sep. 3, 2010

(86) PCT No.: PCT/AU2010/001138
§ 371 (c)(1),
(2), (4) Date: Feb. 24, 2012

(87) PCT Pub. No.: WO2011/026189
PCT Pub. Date: Mar. 10, 2011

(65) Prior Publication Data
US 2012/0155959 A1 Jun. 21, 2012

(30) Foreign Application Priority Data
Sep. 3, 2009 (AU) .................................. 2009904256

(51) Int. Cl.
*A01G 29/00* (2006.01)
*C02F 3/32* (2006.01)
*C02F 103/00* (2006.01)

(52) U.S. Cl.
CPC .................. *A01G 29/00* (2013.01); *C02F 3/327* (2013.01); *C02F 2103/001* (2013.01)
USPC ...................................... 404/4; 404/7; 405/53

(58) Field of Classification Search
CPC .............................. E03F 5/046; A01G 27/02
USPC .................. 404/2–5, 7, 8; 405/43–45, 50, 53
See application file for complete search history.

(56) References Cited

U.S. PATENT DOCUMENTS

| | | | | |
|---|---|---|---|---|
| 3,837,168 | A * | 9/1974 | Alsberg et al. | 405/50 |
| 4,382,713 | A * | 5/1983 | Kawahara | 404/4 |
| 4,923,330 | A * | 5/1990 | DeTommaso | 405/36 |
| 5,975,797 | A * | 11/1999 | Thomas et al. | 405/45 |
| 6,017,166 | A * | 1/2000 | Mossburg, Jr. | 404/5 |
| 6,095,718 | A * | 8/2000 | Bohnhoff | 405/52 |
| 6,592,761 | B2 * | 7/2003 | Wofford | 210/602 |
| 7,179,371 | B1 * | 2/2007 | Bistline | 210/163 |
| 7,357,861 | B2 * | 4/2008 | Kelley et al. | 210/162 |
| 7,422,683 | B2 * | 9/2008 | Park | 210/170.03 |
| 7,503,725 | B1 * | 3/2009 | Pratt et al. | 405/50 |
| 7,540,954 | B2 * | 6/2009 | An et al. | 210/170.03 |
| 8,017,006 | B2 * | 9/2011 | Lopez | 210/163 |
| 8,051,568 | B2 * | 11/2011 | Moody et al. | 29/896.62 |
| 8,235,624 | B2 * | 8/2012 | Lill | 404/4 |
| 8,240,946 | B2 * | 8/2012 | Applefield | 404/4 |
| 2005/0042030 | A1 * | 2/2005 | Fu | 405/36 |
| 2012/0217194 | A1 * | 8/2012 | Sansalone | 210/170.03 |

* cited by examiner

Primary Examiner — Raymond W Addie
(74) Attorney, Agent, or Firm — Birch, Stewart, Kolasch & Birch, LLP.

(57) ABSTRACT

An installation to assist in water usage of rainwater which has a number of take-offs positioned along a curb alongside a road where these are separately connected to respective inground chambers filled with particulate material to encourage root access from trees in the vicinity.

14 Claims, 8 Drawing Sheets

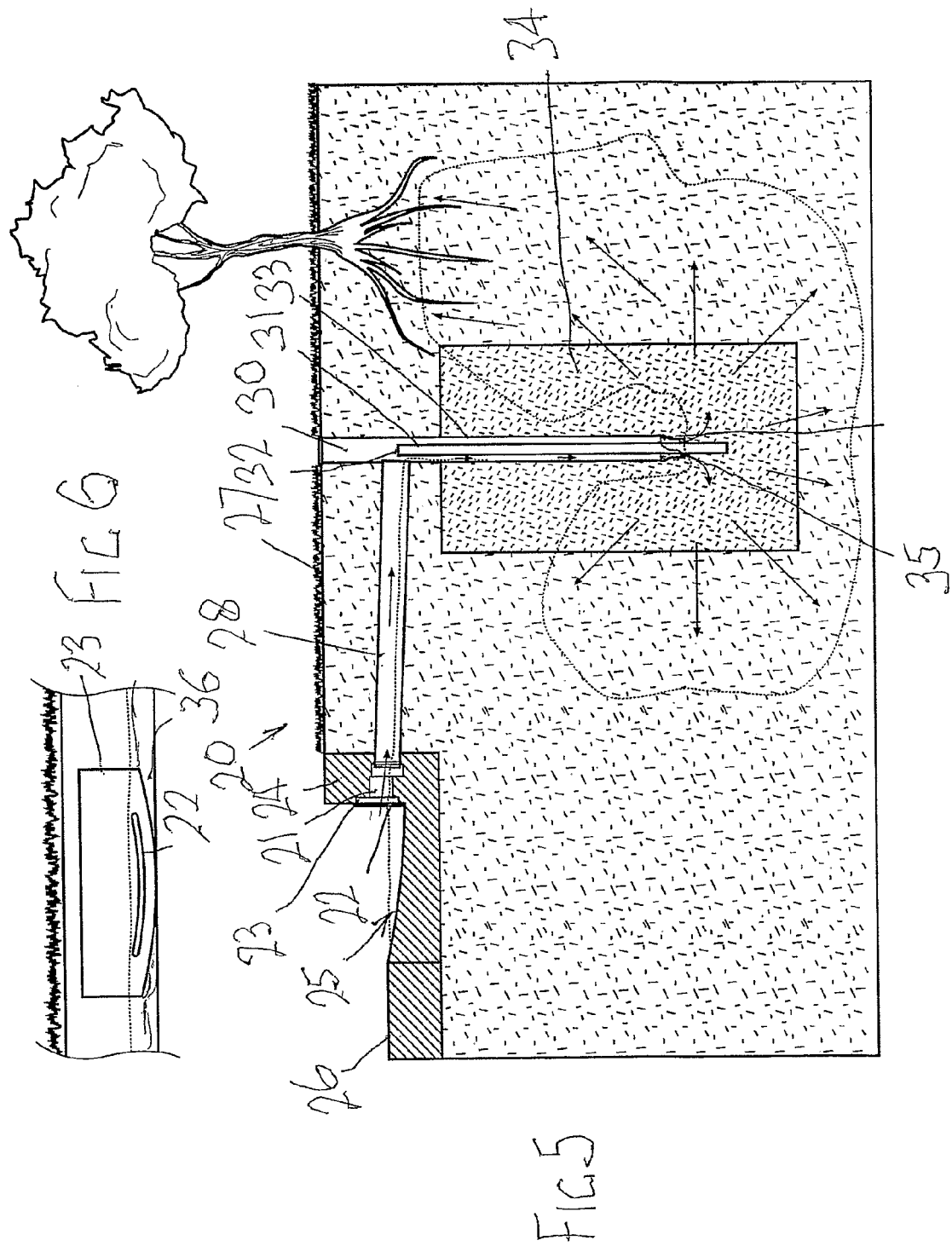

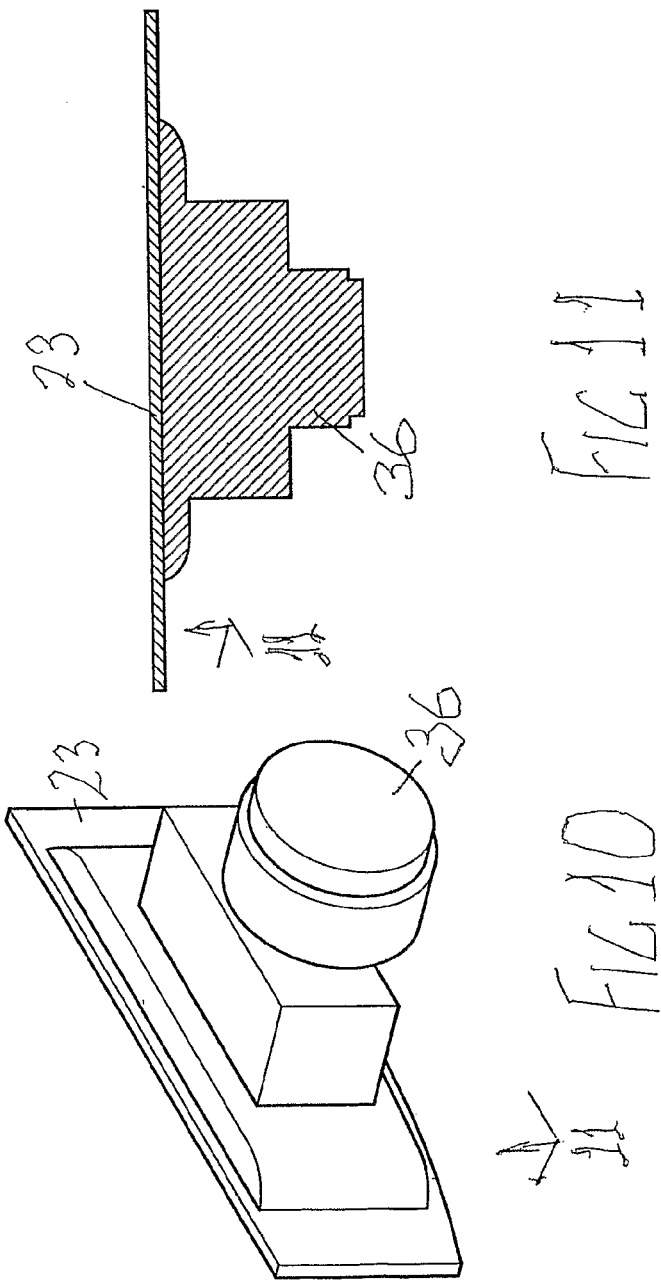

ARRANGEMENT AND METHOD FOR FACILITATING WATER USAGE

This application is the National Stage under 35 USC §371 of International Application Number PCT/AU2010/001138 filed on Sep. 3, 2010, which claims priority under 35 USC §119(a)-(d) of Application Number 2009904256 filed on Sep. 3, 2009 in Australia.

This invention is directed to both an arrangement for assisting in effecting water usage, a method of effecting water usage, and apparatus facilitating such an arrangement and method.

DESCRIPTION OF THE TECHNICAL AREA

It is well known that large quantities of water from made pavements and other water collection areas are directed into storm water collection conduits and then directed to dispersal areas or into larger watercourses or to the sea.

A problem relatively specific to such waters is that they are collected from made areas which could be subject to substantial vehicular traffic but in any event where deposit of contaminate materials is to be highly expected.

The problem then is that if the water is directed immediately to a collection area for immediate use, it is then potentially a contaminant.

It is well established now that an appropriate route for such water is to direct this into a wetlands area where there are natural cleansing processes being affected and the water subject to this natural treatment then is useful.

Such a process however requires substantial rediversion of collection conduits, significant areas available for wet land development, and then finally further reticulation of eventual clean water for provision to useful applications.

OBJECT OF THIS INVENTION

My object is to assist in economic water usage using runoff water in a way that might provide plant access.

SUMMARY OF THE INVENTION

My proposal is to provide take offs which are arranged to collect water directly from a kerb and direct this into a storage chamber beneath the ground to which growing plants can then have access.

A first issue with such a proposal however is that run off water will normally be carrying significant solid contaminants such as leaves, sticks, and residual sediments.

An installation for facilitating water usage comprising take-offs having for each an aperture through kerbing at the side of a road, each take-off being at spaced apart locations along the kerbing, which apertures are each arranged to collect at least some of water passing the kerbing directly and a conduit connecting the passageway into respectively for each, a storage chamber within the ground adapted to facilitate root growth access thereto.

In preference the plant or plants is or are a tree or trees in the vicinity of the storage chamber which may be in a footpath.

In preference then, I provide that an intake from the kerb provides a preliminary grating arranged to facilitate the passage there past of larger debris but enable the passage there through of water separated from such debris.

In preference this grating is provided by a single slot.

In preference the slot or slots are aligned so that they are elongated along a direction generally of expected water flow.

In preference this preliminary grating is a single slot, a plurality of slots or spaced apart apertures.

In preference this grating can be provided by a face plate.

In preference there is also a depression within a gutter adjacent the respective take-off.

A next problem however is that such water is often carrying significant sediments and I therefore propose that a conduit directed to an underground chamber include within its length a settlement chamber where it is adapted to retain water for a modest period to allow settlement of sediment.

A further issue relates to a storage chamber. This can be variously configured but in one instance includes a cylindrical wall defining an inner chamber and an outer wall defined by a cut wall of earth and particulate fill in between the inner and outer walls.

In another alternate arrangement however there is provided a single chamber with the wall defined by a cut wall of earth and this chamber then either fully filled with particulate materials or at least mostly filled with particulate materials.

A problem still remains which is that water collected from run off will still contain very often, contaminants which could be injurious to growing plants.

I have discovered that there are materials which can usefully reduce contaminants and which can in many cases be obtained economically.

Advantageously, reticulated water supplies are now conventionally filtered and the residual separated material is found to be particularly useful for this application especially in that, in order to maintain the health of the reticulated water supply, materials such as activated carbon are added to the water supplies prior to the filtration process.

An issue however remains as to how to use this in a way which is appropriate for the application, relatively economic in its use and which facilitates access to retained water only after it has been filtered in effect by such material.

My proposal then is to provide that this material be the particulate material either totally or substantially. This has the joint advantage that water can dissipate from the chamber but also allow roots of plants to access directly into this material.

In the case of having an inner and outer wall in preference, such a wall is made from a material which can be economically achieved and can be long lasting.

In preference, such a wall is comprised of tyre casings located one upon the other so as to define substantially a cylindrical shape and where the tyres or tyre casings are held together to provide such a shape.

In preference, such tyre casings have coincident apertures through their walls so that water that might reside within a casing shape will be able to pass through that wall, and then through a coincident aperture in the top wall of an underneath casing and so on.

In preference there are at least three or four such apertures generally symmetrically positioned around a diameter of each respective tyre casing.

In preference, the sediment trap is located so it is positioned to extend into the inner chamber defined by the tyre casings and further, has an uppermost openable cap so that collected sediment can be accessed from time to time and pulled from the sediment trap.

In preference, in order to provide an initial collection of water which would be separate from turbulent flow, there is provided as a sediment trap, a first vertical conduit, a second conduit of lesser diameter and passing coaxially through the first conduit, the second conduit having a piston at a lower end adhering to the second conduit, the second conduit defining an overflow head whereby water once having filled the first conduit will flow through the second conduit into a water chamber or in this case the inner chamber.

The concept of using an inner chamber wall comprised of tyre casings is of advantage is so far that water and to some, extent roots can pass between the casings although this will depend to the extent to which there is compression on the casings.

In a preferred arrangement, a plurality of such tyres are held together and in coaxial alignment by tyres surrounding in several places the wall of the tread portion of the respective tyres.

In another case, a strap is directed to pass through the actual walls of the tyres and in preference through apertures in the walls where water can pass through so that the strapping itself then facilitates maintenance of the alignment of the apertures between the walls.

In another form the invention can be said to reside in the method of facilitating water usage which includes the steps of taking off water at spaced locations along a length of kerbing, and directing such water into a chamber alongside the kerbing in a way which facilitates access by plants to the water thereafter.

In a further form the invention can be said to reside in a method of providing an installation as in any one of the preceding claims where there is a kerbing which includes the steps of providing in a first instance an insert moulded into the concrete of a portion of a kerb, and subsequently removing the moulded insert, laying a conduit between each aperture left and a storage chamber cut in the earth beneath the ground, inserting a silt collector in the storage chamber before filling this chamber with particulate material.

In preference there is provided a removable face plate with at least one slot therethrough positioned on an outerside of the kerb covering the insert.

BRIEF DESCRIPTION OF THE DRAWINGS

For a better understanding of this invention it will now be described in relation to an embodiment which should be described with the assistance of drawings wherein, FIG. 5 is a cross section of an installation according to this invention according to a second embodiment, FIG. 6 is a view from in front of the kerbing showing the face plate and its lower slot providing water access, FIG. 10 is a perspective view of lost form work providing polystyrene filler with a face plate attached, and FIG. 11 is a view along the lines 11, 11.

DESCRIPTION OF THE EMBODIMENTS

Figure 1:
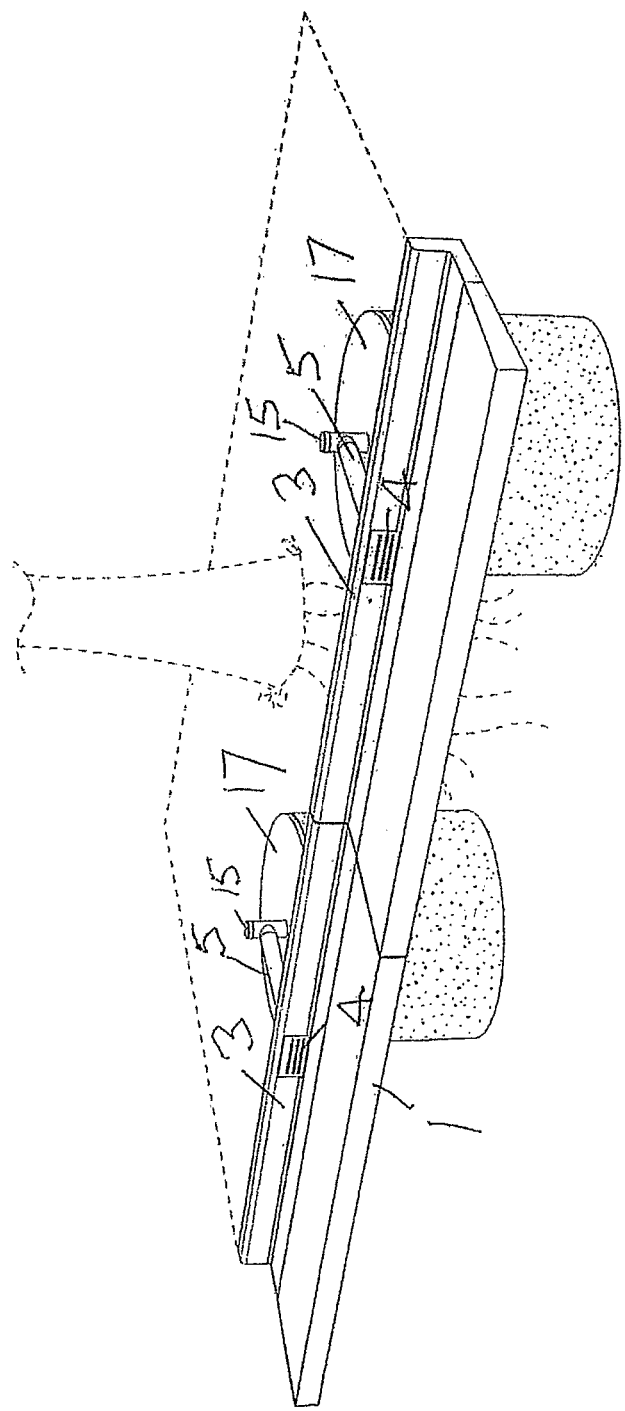
FIG. 1 is a perspective view showing an arrangement according to a first embodiment.
Figure 2:
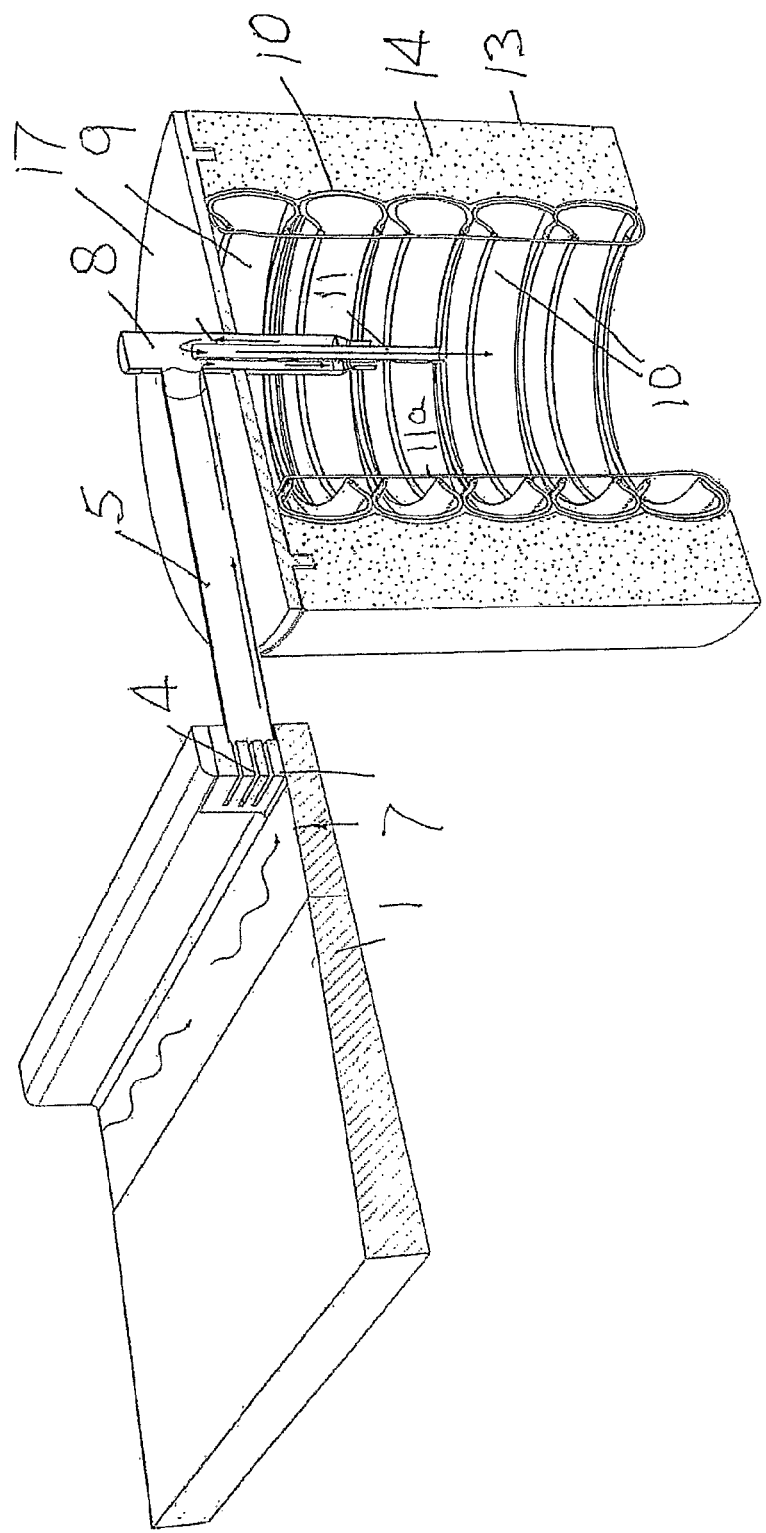
FIG. 2 shows a portion of that arrangement as in FIG. 1 in this case shown however as a part cut away cross section.

An installation or arrangement according to this embodiment is to be associated with a made surface such as at 1 which could be a road, a parking lot, a further pathway or similar.

We have made kerbing providing a gutter with a kerb 3 which has three parallel apertures passing therethrough at 4, each of the apertures being positioned to extend horizontally so that a front face is provided where sticks and stone and leaves that would normally be washed down the gutter 2 will continue to pass by and will not be directly impeded by the shape of the slots but water will pass through these and pass into downwardly sloping conduit 5.

A lower one of the slots 4 at 6 is positioned above a floor level 7 of the gutter so as to avoid a lot of the finer sediment sands and like that might otherwise pass into the collection arrangement.

The downwardly sloping conduit 5 is directed to a vertical conduit 8 which is positioned so as to extend into an inner chamber 9 which is defined by a plurality of tyre casings 10 which are held together by straps such as at 11 and were not shown but intended to be in positioned are apertures in the respective walls of these tyres 10 to allow for water to pass therebetween and to thereby not be retained within the cavernous shape that might otherwise retain the water.

The vertical conduit 8 is positioned to extend coaxially with the tyre casings 10. 8 is an inner conduit 11 which acts to allow overflow water within the conduit 8 to then pass through an outlet 12 into the inner chamber area 9. The whole of the arrangement of water storage is contained within a larger chamber 13 and there is fill 14 located between the inner wall defined by the tyres 10 and the outer wall of the outer chamber 13.

This fill is in this case a particulate material providing a filtering of water that will be gathered within the inner chamber 9.

In this embodiment, the fill is a material obtained being the filtered residue from a reticulated water supply and it contains among other materials captured activated carbon.

It has the advantage of providing a load bearing surface, and is also able to retain a porosity which provides a high extent of surface area for contaminant adhesion as well as access there through of roots growing along the moisture gradient.

The vertical conduit 8 is designed as a sediment trap and the central inner conduit 11 is designed to be able to be accessed through an uppermost gap 15 and able then to be lifted with an accompanying piston 16 which then would be expected to lift captured sediment.

Figure 3:
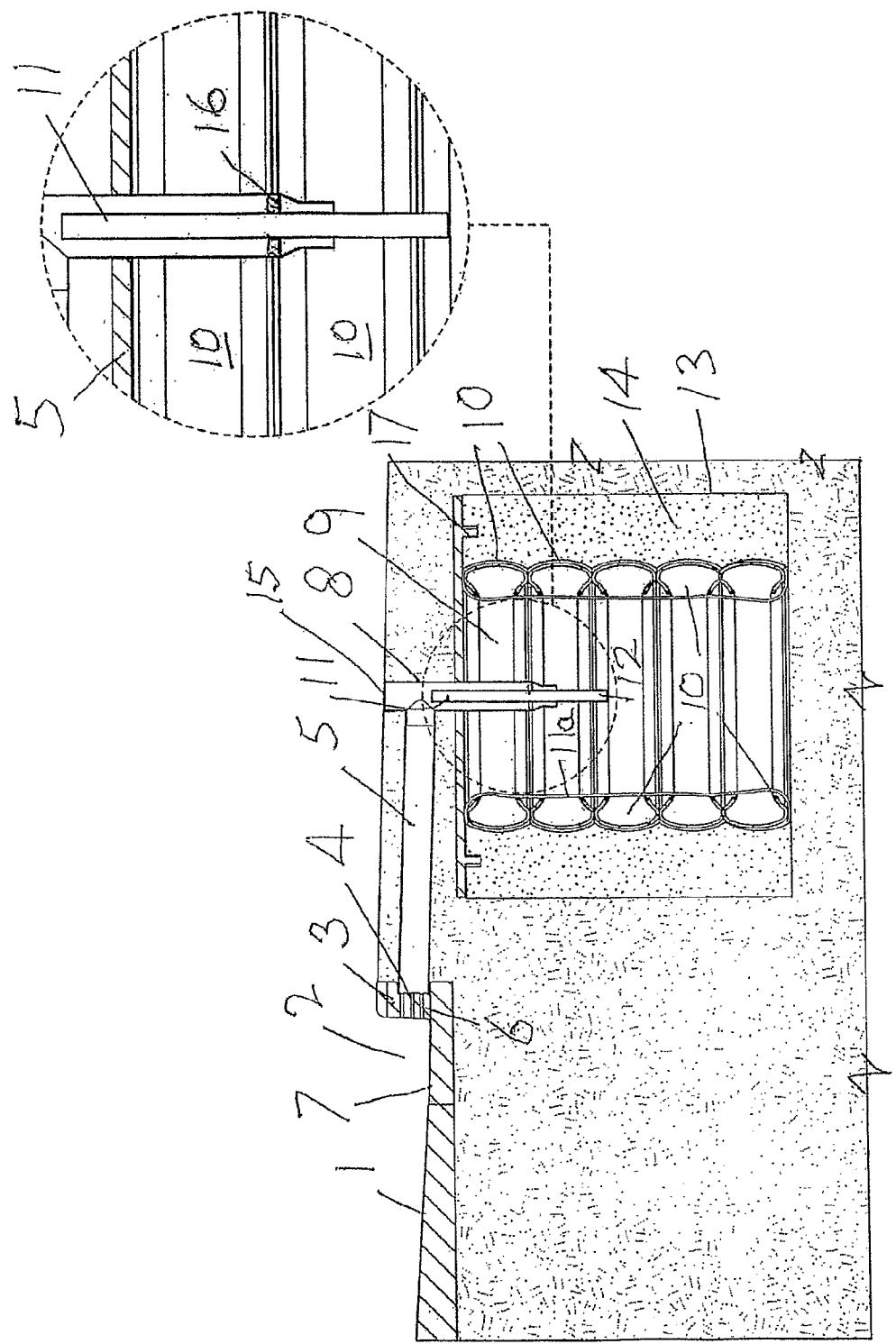
FIG. 3 is a cross sectional view of the arrangement as in FIG. 2.

A lid 17 is positioned over the respective inner and outer chambers and covered with earth as shown especially in FIG. 3.

Figure 4:
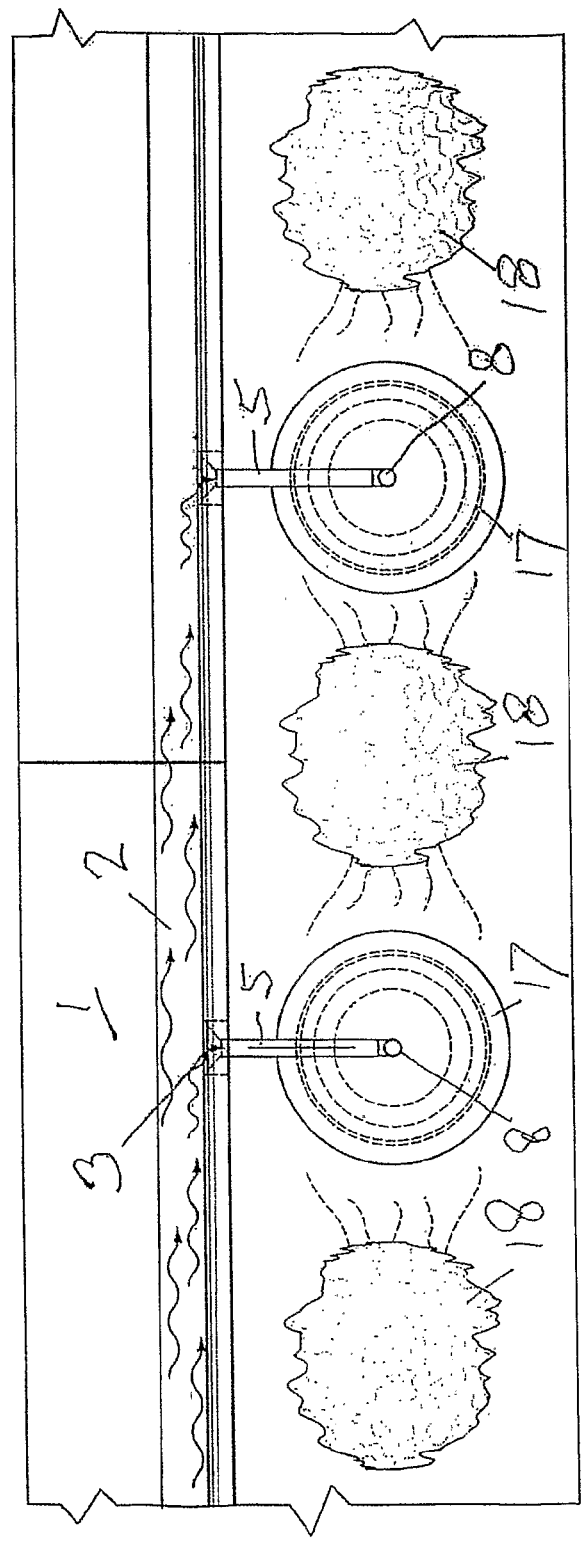
FIG. 4 is a planned view of the arrangement as in FIG. 1.

The arrangement is designed to be used in conjunction with growing plants such as trees as is specifically shown in FIGS. 1 and 4 at 18.

The embodiment then is directed to the use of this filtrate material and an underground chamber in association with storage of water where the storage allows for seepage of the water through the fill material.

In another arrangement, the embodiment incorporates a chamber defined by a plurality of vehicular tyre casings located one upon the other and being of common diameter and being held together to provide thereby a substantially cylindrical shape providing for temporary water storage beneath the ground.

In another case, the embodiment illustrates a technique for efficiently and effectively providing preliminary gross filtration of water being take directly from kerbing by having a plurality of parallel apertures generally horizontally or at least in relation to the alignment of the gutter being parallel to this.

The embodiment also discloses a sediment trap where access can be achieved from time to time by manually withdrawing a lower most piston to clear the trap for a subsequent reuse.

Now referring to the second embodiment this is generally shown in FIG. 5 and includes an installation 20 which has a take off 21 defining an aperture 22 in a face plate 23 are located within a kerbing 24.

This kerbing 24 defines the side of a gutter 25 which in this case is the side of a road 26 where there is a footpath on the other side of the kerbing 24 at 27.

A conduit 28 is connected to the take off 21 and has a downward slope size to direct water into a vertical conduit 30.

This vertical conduit 30 is configured to provide a silt collector by having an inner conduit 31 of lesser diameter than the first conduit 30 and with an upper inlet at 32 positioned so that only when water fills the co-annular space 33 between the outer and inner conduits 30 and 31 will water then pass through the inner conduit 31 into chamber 34.

This chamber 34 is defined by a hole cut in the ground in cylindrical shape and substantially filled with material which has been recovered from filtering reservoir water and is a particulate material carrying with it however minerals and other substances of value to plants.

The inner conduit 31 has a collar 35 which is attached to the inner conduit 31 and is adapted so that when the inner conduit 31 is lifted it will engage the inner wall of outer conduit 30 and bring with it collected silt so it acts as a cleaning member.

The vertical conduit 30 is located axially centrally of the otherwise cylindrical chamber 34 and is arranged such that water once it passes from the sediment trap will enter into this area through the inner conduit 31.

One of the issues with such an arrangement is that it is intended that there be a plurality of such installations along a length of kerbing so that spaced apart trees along a street will receive and have retained in their vicinity water that otherwise would run off simply as storm water.

In preparing such an installation, it will be at first appreciated that this will require some modification of kerbing but it is intended that in anticipation of such a take off being installed, that in the first place, there by embedded within made kerbing a readily removable lost form work which can be readily accessed subsequently and removed to then further install the conduit pit and the like.

According to this embodiment, I propose that there be this face plate 23 made from a suitable sheet of plastic material and having a slot defining an aperture at 22 in this place 23.

There is some advantage in having the slot of curved shape so that for a small rise in water level, a centre only of the slot will be used and this inherently then will concentrate the stream as a stream of water where it reaches a first height but that if the water reaches a higher level, then more of the slot will be accessed.

In this way then, there can be some limit to the amount of water that might go through a single slot allowing further water to travel past this slot to further slots along the length of kerbing.

This effect can be accentuated by having a portion of the gutter also having such a section of the gutter curved in the vicinity of this slot as shown at 30, 36.

The advantage of a face plate of this type is also that it can be removed, a filler material can then be accessed and removed behind the face plate, and thereafter the face plate can be returned and kept in place either by adhesion or by screws.

Figure 7:
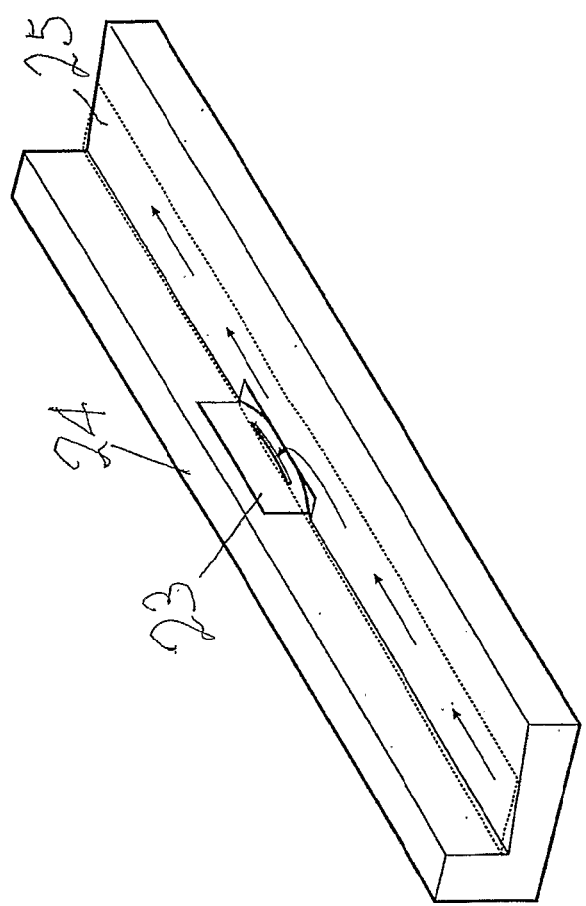
FIG. 7 is a perspective view of a kerbing with a face plate as in FIG. 6 in conjunction with a gutter showing in this case 1 take off.

This is further shown in FIG. 7 where a larger portion of the gutter with the curving is showing the face plate 23 in this case.

Figures 8, 9:
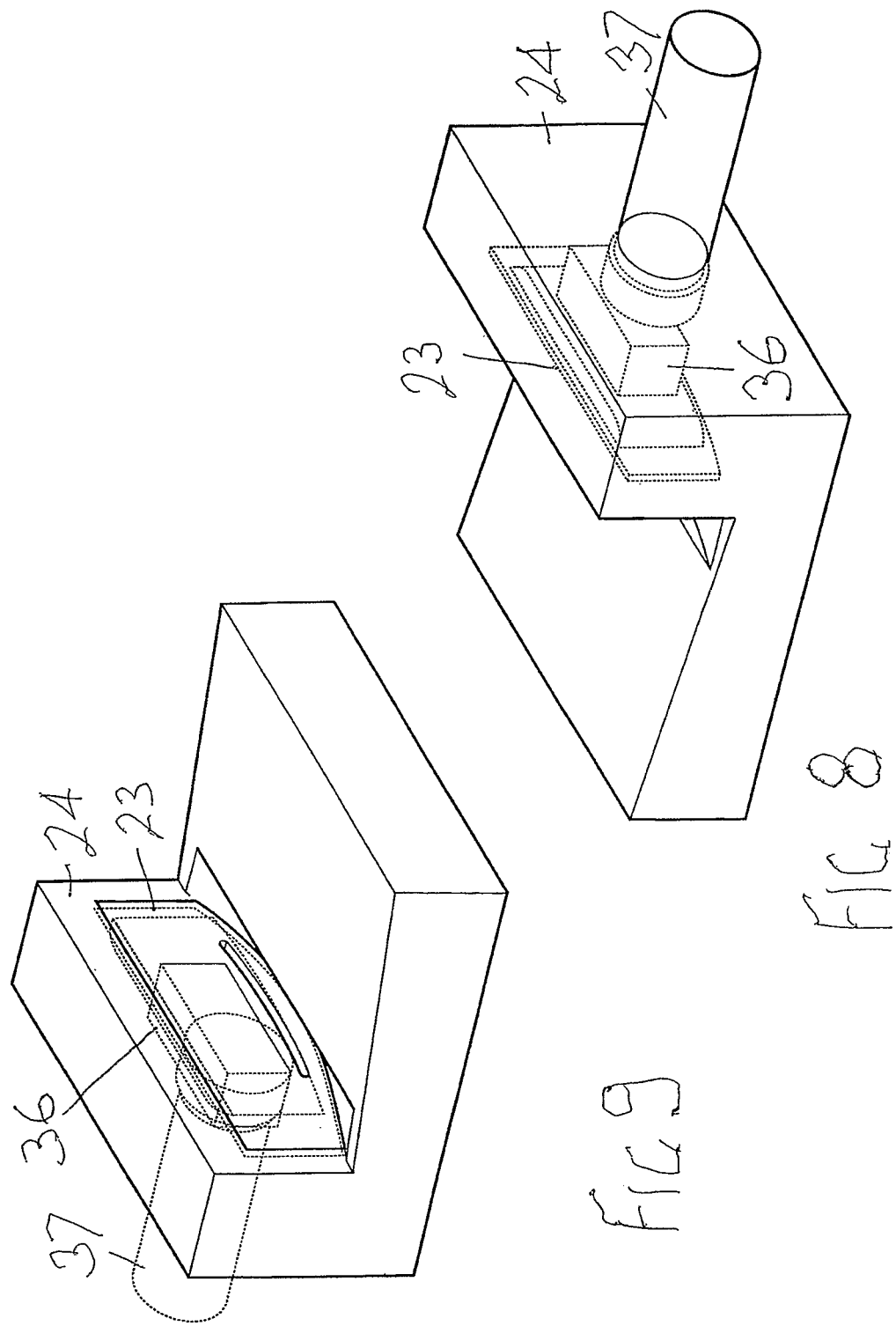
FIG. 8 illustrates the way in which the face plate covers an aperture arrangement within a kerb to facilitate take off of water directed into a conduit.
FIG. 9 is a view from the opposite side showing however placement of some lost form work where the kerbing has been modified anticipating in the future a take off to be connected to a conduit.

FIGS. 8 and 9 show a preinstalled lost form work mould 36 that is embedded into the concrete of kerb 24 that in this case is of polystyrene plastic and can remain in place behind the face plate 23 for some years in needed. However when a take-off is to be activated the process is to remove the face plate 23, gouge out the plastic of the insert mould 36 and then simply replacing the face plate 23, and connecting a conduit as shown at 37 which is then connected to a silt collector and a storage chamber for holding of collected water for plant access thereafter.

FIGS. 10 and 11 show the lost form work 36 with an attached face plate 23 apart from a surrounding kerb.

In a further form, the invention could be said to reside in an installation for facilitating run off water usage, including a made pavement with a kerbing to direct run off water, and an adjacent plant growing area along side the kerbing, a water passageway passing from an opening in the kerbing, through the kerbing to collect otherwise passing water and divert this to a collection chamber beneath the surface level of the adjacent plant growing area, the collection chamber having within it a wall providing an approximately cylindrical space with a vertical axis, a surrounding fill extending between the wall and earth defining an outer wall of the chamber, the fill being of water permeable material and a cover or covering over the collection chamber.

It will now be seen that this facilitates potentially contaminated road runoff water to be diverted economically to trees and vegetation growing in the vicinity of the gutter where the pollutants are bioremediated at source. There is an additional benefit to the vegetation in the provision of a water storage capacity in the subsoil that can be accessed by tree roots during times of drought.

The invention claimed is:

1. An installation for providing water to a plant growing area comprising take-offs having for each an aperture through kerbing at the side of a road, each take-off being at spaced apart locations along the kerbing, which apertures are each arranged to collect at least some of water passing the kerbing directly and a conduit connecting the passageway into respectively for each; a storage chamber within the ground, the chamber including a wall defining an inner chamber leaving then a gap between the walls defining an outer and inner chamber, and particulate material substantially filling the gap, wherein the inner chamber wall is adapted to allow entry of roots therein and the particulate material (i) provides a high extent of surface area for contaminant adhesion and (ii) in use provides a moisture gradient to facilitate root growth access to the inner chamber.

2. An installation as in claim 1 further comprising for each take-off a face plate on an outer side of the kerbing and having at least one aperture therethrough connecting water passing through the aperture to the conduit.

3. An installation as in claim 1 further including a made pavement and gutter with the kerb to direct run off water, and an adjacent plant growing area along side the kerbing.

4. An installation as in claim 1 where the aperture is an elongated slot of substantially constant width through its length to facilitate passage there past of larger debris but enable the passage there through of water separated from such debris.

5. An installation as in claim 1 where the conduit directed to the underground storage chamber includes within its length a settlement chamber where water will be retained to allow settlement of sediment.

6. An installation as in claim 1 where the chamber in the earth includes a wall defining an inner chamber leaving then a gap between walls defining the outer and inner chamber, and particulate material substantially filling the gap.

7. An installation as in claim 6 wherein the inner chamber is defined by a wall comprised of tyre casings positioned one upon the other.

8. An installation as in claim 7 wherein said tyre casings have coincident apertures through their walls so that water that might reside within a casing shape will be able to pass through that wall, and then through a coincident aperture in the top wall of an underneath casing.

9. An installation as in claim 7, wherein a sediment trap is located so it is positioned to extend into the inner chamber defined by the tyre casings and further, has an uppermost openable cap so that collected sediment can be accessed from time to time and pulled from the sediment trap.

10. An installation as in claim 1 wherein there is provided as a sediment trap, a first vertical conduit, a second conduit of lesser diameter and passing coaxially through the first conduit, the second conduit having a piston at a lower end adhering to the second conduit, the second conduit defining an overflow head whereby water once having filled the first conduit will flow through the second conduit into a water chamber.

11. An installation as in claim 1 wherein the storage chamber is substantially a single chamber defined by earth walls with particulate material substantially filling the chamber.

12. An installation as in claim 1 wherein there is at least one tree growing in an adjacent vicinity to the storage chamber.

13. A method of providing an installation as in claim 1 where there is a kerbing which includes the steps of providing in a first instance an insert moulded into the concrete of a portion of a kerb, and subsequently removing the moulded insert, laying a conduit between each aperture left and a storage chamber cut in the earth beneath the ground, inserting a silt collector in the storage chamber before filling this chamber with particulate material.

14. A method as in claim 13 in which there is provided a removable face plate with at least one slot therethrough positioned on an outerside of the kerb covering the insert.

* * * * *